United States Patent
Shimura et al.

(10) Patent No.: US 11,380,963 B2
(45) Date of Patent: Jul. 5, 2022

(54) SECONDARY BATTERY

(71) Applicant: NEC Corporation, Tokyo (JP)

(72) Inventors: Kenichi Shimura, Tokyo (JP); Kazuhiko Inoue, Tokyo (JP)

(73) Assignee: NEC CORPORATION, Tokyo (JP)

( * ) Notice: Subject to any disclaimer, the term of this patent is extended or adjusted under 35 U.S.C. 154(b) by 113 days.

(21) Appl. No.: 16/094,353

(22) PCT Filed: Apr. 18, 2017

(86) PCT No.: PCT/JP2017/015567
§ 371 (c)(1),
(2) Date: Oct. 17, 2018

(87) PCT Pub. No.: WO2017/183633
PCT Pub. Date: Oct. 26, 2017

(65) Prior Publication Data
US 2019/0123319 A1 Apr. 25, 2019

(30) Foreign Application Priority Data
Apr. 20, 2016 (JP) .............................. JP2016-084564

(51) Int. Cl.
*H01M 50/431* (2021.01)
*H01M 10/04* (2006.01)
(Continued)

(52) U.S. Cl.
CPC ....... *H01M 50/446* (2021.01); *H01M 10/049* (2013.01); *H01M 50/431* (2021.01); *H01M 50/411* (2021.01); *H01M 50/423* (2021.01)

(58) Field of Classification Search
CPC .. H01M 2/166; H01M 2/1646; H01M 2/1653; H01M 10/049; H01M 50/446; H01M 50/431; H01M 50/411
See application file for complete search history.

(56) References Cited

U.S. PATENT DOCUMENTS

| 5,882,721 A | 3/1999 | Delnick |
| 2006/0134526 A1 | 8/2006 | Han et al. |

(Continued)

FOREIGN PATENT DOCUMENTS

| CN | 1795578 A | 6/2006 |
| CN | 100593872 C | 3/2010 |

(Continued)

OTHER PUBLICATIONS

MIT Property Table for Polyimide (Year: 2004).*

(Continued)

*Primary Examiner* — Christopher P Domone
*Assistant Examiner* — Kimberly Wyluda
(74) *Attorney, Agent, or Firm* — Sughrue Mion, PLLC

(57) ABSTRACT

Provided is a battery comprising a separator comprising inorganic particles for preventing a short-circuit, wherein the inorganic particles are not removed readily from the separator. This battery is characterized by comprising a separator comprising a base material resin having voids and an inorganic particle having a surface (A) facing the void and a surface (B) in contact with the resin, wherein the length of the surface (A) is 50% or more of the length of the outer periphery of the particle in a cross-sectional SEM photograph of the separator.

6 Claims, 2 Drawing Sheets

(51) Int. Cl.
  *H01M 50/411* (2021.01)
  *H01M 50/423* (2021.01)
  *H01M 50/446* (2021.01)

(56) References Cited

U.S. PATENT DOCUMENTS

| | | | |
|---|---|---|---|
| 2008/0248394 A1 | 10/2008 | Inoue et al. | |
| 2013/0045355 A1* | 2/2013 | Ohya | B29C 41/24 428/116 |
| 2013/0209861 A1 | 8/2013 | Yong et al. | |
| 2015/0236323 A1 | 8/2015 | Honda et al. | |
| 2016/0365555 A1* | 12/2016 | Shinohara | H01M 50/411 |

FOREIGN PATENT DOCUMENTS

| | | | |
|---|---|---|---|
| CN | 101689624 | A | 3/2010 |
| CN | 104137300 | A | 11/2014 |
| JP | A-H10-334877 | | 12/1998 |
| JP | B-4075208 | | 4/2008 |
| JP | A-2011-190447 | | 9/2011 |
| JP | B-5344107 | | 11/2013 |
| JP | B-5509563 | | 6/2014 |
| JP | 2016-031856 | A | 3/2016 |
| KR | 20150037394 | A | 4/2015 |
| WO | WO 2011/063132 | A1 | 5/2011 |

OTHER PUBLICATIONS

Shackelford, James F. Alexander, William. See "Table 42. Specific Gravity of Polymers", see PVDF. (2001). CRC Materials Science and Engineering Handbook (3rd Edition). Taylor & Francis. (Year: 2001).*
Gangolli, S. See Table titled "Physical Constants of Chemical Substances", see silica. (2005). Dictionary of Substances and Their Effects (DOSE, 3rd Electronic Edition). Royal Society of Chemistry. (Year: 2005).*
Kynar. (2014). Polyvinylidene Fluoride Performance Characteristics & Data [Brochure]. (Year: 2014).*
International Search Report dated Jun. 13, 2017, in corresponding PCT International Application.
Science unabridged dictionary, First Edition, Tokyo Kagaku Dojin Corporation, (Oct. 20, 1989) p. 2241 (1989).
Chinese Office Action for CN Application No. 201780023703.8 dated Dec. 29, 2020 with English Translation.
Japanese Office Action for JP Application No. 2018-513187 dated Jan. 11, 2022 with English Translation.
Chinese Office Communication for CN Application No. 201780023703.8 dated Aug. 5, 2021 with English Translation.
Xiao et al., Advance in ceramic-based composite separator for lithium-ion battery. Chemical Industry and Engineering Progress, 2015, vol. 34, Issue 2, 456-462.

* cited by examiner

SECONDARY BATTERY

CROSS-REFERENCE TO RELATED PATENT APPLICATIONS

This application is a National Stage Entry of International Application No. PCT/JP2017/015567, filed Apr. 18, 2017, which claims priority from Japanese Patent Application No. 2016-084564, filed Apr. 20, 2016. The entire contents of the above-referenced applications are expressly incorporated herein by reference.

TECHNICAL FIELD

The present invention relates to a battery and a method for manufacturing the same.

BACKGROUND ART

Lithium ion secondary batteries, which feature small size and large capacity, have been widely used as power supplies for electronic devices such as mobile phones and notebook computers and have contributed to enhancing convenience of mobile IT devices. In recent years, larger-scale applications, such as power supplies for driving motorcycles and automobiles and storage cells for smart grids, have attracted attention. As the demand for lithium ion secondary batteries has increased and they have been used in various fields, batteries have been required to have characteristics, such as further higher energy density.

For a battery with high energy density, ensuring safety is a task. In particular, when a short-circuit occurs, there is a high risk of becoming hot inside the battery. When temperature in the battery rises, a separator, which insulates a positive electrode against a negative electrode, can shrink and melt, and the heat generation can further increase. For this reason, the battery with high energy density requires a higher performance separator.

In order to prevent a short circuit when the battery heats up, separators using a base material resin that is higher in melting temperature or heat decomposition temperature than polyolefin resins have been developed. For example, Patent Document 1 discloses an aromatic polyimide porous membrane separator, and Patent Document 2 discloses a polyimide porous membrane separator. Whereas polyolefin separators shrink and melt to lose insulation at less than 200° C., the aromatic polyamide porous membrane separator and the polyimide porous membrane separator can maintain insulation even at 200° C. or higher.

In order to prevent a short circuit when the battery heats up, high heat resistance separators containing insulating inorganic particles have been also developed. As one of these, multilayer structured separators prepared by coating a porous resin membrane separator with the insulating inorganic particles are known. Patent Document 3 discloses a separator comprising a coating layer comprising inorganic particles, such as alumina, and a resin binder on at least one surface of a polyolefin-based resin porous film.

CITATION LIST

Patent Document

Patent Document 1: Japanese patent No. 5509563
Patent Document 2: Japanese patent No. 4075208
Patent Document 3: Japanese patent No. 5344107

SUMMARY OF INVENTION

Technical Problem

Separators made of a resin having high melting temperature or high heat decomposition temperature, such as those described in Patent Documents 1 and 2, can prevent a short-circuit between a positive electrode and a negative electrode up to high temperature range, compared with polyolefin resin separators. However, when temperature rises to its glass transition temperature, the resin softens. At this time, when a force is applied in the thickness direction of the separator, the separator is compressed and thinned, so that its insulating property can be lowered. It is also feared that a projection part on surfaces of a positive electrode and a negative electrode bites into the softened separator, causing a short-circuit between a positive electrode and a negative electrode.

In a separator with an inorganic particle layer, such as that of Patent Document 3, the inorganic particle layer is expected to maintain insulation. However, when the separator is cut, the inorganic particle layer tends to peel off from the cut end surface. In addition, when the separator is slid on transport rolls in a manufacturing process of the battery, the inorganic particle layer peels off in some cases. The peeled-off material in the battery can become a foreign material that causes a problem with a battery function. A foreign material sandwiched in a layered structure consisting of electrodes and separators can break the inorganic particle layer, decreasing insulation when subjected to a compressive force. In addition, when dried to remove moisture, a separator having the inorganic particle layer only on one surface of a substrate can warp due to a difference in stress between the coating layer and the inorganic particle layer. This leads to a problem in another process.

An object of the present invention is to provide a battery comprising a separator comprising inorganic particles for preventing a short-circuit, wherein the inorganic particles do not drop easily.

Solution to Problem

The battery according to the present invention comprises a separator, the separator comprising a base material resin having voids and an inorganic particle having a surface (A) facing the void and a surface (B) in contact with the resin, wherein the length of the surface (A) is 50% or more of the length of the outer periphery of the particle in a cross-sectional SEM photograph of the separator.

Advantageous Effect of Invention

According to the present invention, there can be provided a battery comprising a separator comprising inorganic particles for preventing a short-circuit, wherein the inorganic particles do not drop easily.

DESCRIPTION OF EMBODIMENTS

Separator

Figure 1:
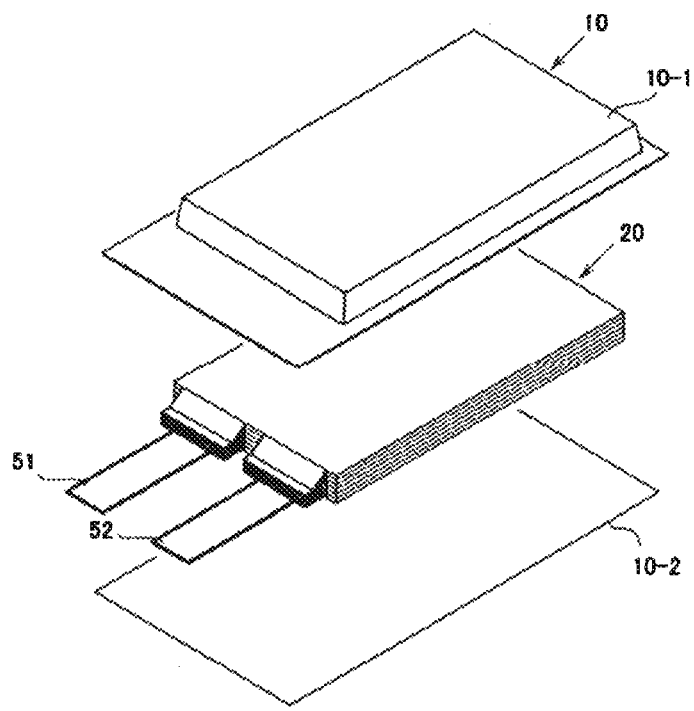
FIG. 1 is an exploded perspective view showing a basic structure of a film package battery.

The battery according to the present invention comprises a separator comprising a base material resin having voids and an inorganic particle having a surface (A) facing the void and a surface (B) in contact with the resin, wherein the length of the surface (A) is 50% or more of the length of the outer periphery of the particle in a cross-sectional SEM photograph of the separator. Hereinafter, a separator used in the battery of the present invention will be described.

The base material resin of the separator is not particularly limited, but examples thereof include polyolefins such as polypropylene and polyethylene, cellulose, polyethylene terephthalate, polyvinylidene fluoride, polyimides, polyamideimides, polyphenylene sulfides, aromatic polyamides (aramid) such as polymetaphenylene isophthalamide, polyparaphenylene terephthalamide and copolyparaphenylene 3,4'-oxydiphenylene terephthalamide, and the like. Temperature in a battery having high energy density readily rise when an abnormality or accident, such as excessive charge/discharge, short-circuit or damage due to an external force, occurs. Therefore, a high heat resistance resin which does not shrink thermally even at high temperature is preferable. The high heat resistance resin which does not shrink thermally can prevent contact between a positive electrode and a negative electrode. In addition, since it does not shrink thermally, the inorganic particles can be kept in the separator even at high temperature. The base material resin of the separator preferably has a melting temperature and/or a decomposition temperature of 200° C. or more, and more preferably 250° C. or more. Examples of such a high heat resistance resin include polyethylene terephthalate, aramids, polyimides, polyamideimides, polyphenylene sulfides and the like.

The inorganic particles are present in the resin-based separator. As materials of the inorganic particles, highly insulating inorganic materials, such as metal oxides and metal nitrides, including aluminum oxide (alumina), silicon oxide (silica), titanium oxide (titania), zirconium oxide (zirconia), magnesium oxide (magnesia), zinc oxide, strontium titanate, barium titanate, aluminum nitride, silicon nitride and the like are preferably used. The separator comprising the highly insulating inorganic particles can suppress a short circuit in the battery. In addition, functions of the separator can be maintained due to the inorganic particles even if a problem occurs in the base material resin. For example, when the battery is compressed in a state where a foreign material is sandwiched between the separator and an electrode, collapsing a porous structure in a general separator may lead to a short-circuit. The separator comprising the inorganic particles can prevent a short-circuit in such a case, because the inorganic particles work as an insulating spacer even if a porous structure collapses. The inorganic particles that is an insulating spacer prevent a short-circuit even if the separator receives a compressive force in a temperature environment which softens the resin. In addition, the inorganic particles can prevent a short-circuit even at the decomposition temperature of the base material resin as long as the inorganic particles remain there.

The inorganic particles are less likely to fall out from the separator at the time of cutting the separator because the inorganic particles are within the separator. If the inorganic particles should fall out, the inorganic particles were loss likely to agglomerate because they are present independently of each other. Even if a surface of the separator is slid, since the inorganic particles are inside the surface of the base material resin, the inorganic particles are less likely to fall out. Even if the outermost surface of the separator substrate becomes worn down, the inorganic particles are less likely to fall out as lumps because they are present independently of each other.

The inorganic particles have the surface (A) facing the void and the surface (B) in contact with the resin. The surface (A), which narrows the surface (B), can suppress a decrease in the strength of the separator caused by peeling off the inorganic particles in interfaces between the resin and the inorganic particles (interfacial peeling off). When the surface (B) is large, the separator has low flexibility, and the interfacial peeling off tends to occur by a force such as tension or bend. In the separator with the interfacial peeling off, only the resin part supports the separator structure, but the amount of the resin is small by the amount of the inorganic particles compared to a separator not containing the inorganic particles, so that the mechanical strength of the separator is decreased. Such a separator with low mechanical strength can be broken when a foreign material is sandwiched between an electrode and the separator due to failure in a manufacturing process or when unexpected force is applied from the outside of the battery. Even in normal use, the separator deteriorates with stress due to expansion and contraction of an electrode in accordance with charge and discharge, and its short circuit prevention performance can decrease at the time of dendrite formation. In addition, for the separator with low mechanical strength, reducing the thickness or increasing the porosity to improve battery performance is difficult. A separator prepared by mixing the inorganic particles in a resin is also known, but in many cases, the surface (A) is not present or the surface (A) is narrow. Therefore, compared to such a separator, the separator used in the present invention can improve the above-mentioned problem due to a decrease in mechanical strength.

In addition, the inorganic particles can contact with an electrolyte solution on the surface (A) facing the void. Electrolyte solutions may comprise metal ions, such as manganese, nickel and cobalt, eluted from an active material and a current terminal. The eluted metal ions may precipitate on a separator and a negative electrode. The eluted metal ions turn into the resistance of lithium ion diffusion, damage a coating film on the negative electrode, and thereby deteriorate battery performance. The inorganic particles have ability to adsorb metal ions. The inorganic particles in contact with the electrolyte solution can absorb such a metal eluted into an electrolyte solution to prevent deterioration of battery performance.

Figure 3:
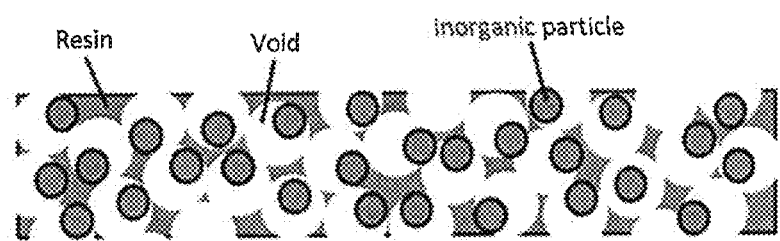
FIG. 3 is a schematic view showing a cross section of the separator used in the battery of the present invention.
Figure 4:
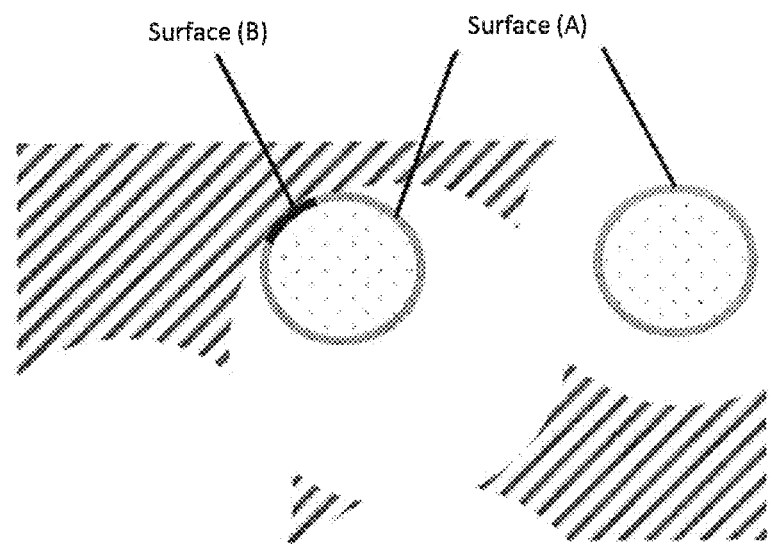
FIG. 4 is a schematic view showing a cross section of the separator used in the battery of the present invention on a large scale than in FIG. 3 to show two surfaces of the inorganic particle.

To increase such effects, the ratio of the surface (A) in the surface of the inorganic particle is preferably high. The ratio of the surface (A) can be determined by observing a cross section of the separator with a scanning electron microscope (SEM). In a cross-sectional SEM photograph of the separator, the length of the surface (A) on the outer periphery of the particle is preferably 50% or more, more preferably 65% or more and most preferably 80% or more of the length of the outer periphery of the particle. FIGS. 3 and 4 schematically show the inorganic particles in a cross section of the separator. The inorganic particles in which only the surface (A) is present on the outer periphery may be seen in a cross section of the separator as shown in FIGS. 3 and 4. In this case, the length of the surface (A) is the same as that of the outer periphery of the particle. Hereinafter, in order to simplify the following descriptions, the inorganic particles will be described with abbreviations according to the ratio of the surface (A). "Inorganic particle (1)" represents the inorganic particle in which the length of the surface (A) on the outer periphery of the particle is 50% or more and less than 65% of the length of the outer periphery of the particle in a cross-sectional SEM photograph of the separator. "Inorganic particle (2)" represents the inorganic particle in which the length of the surface (A) on the outer periphery of the particle is 65% or more and less than 80% of the length of the outer periphery of the particle in a cross-sectional SEM photograph of the separator. "Inorganic particle (3)" represents the inorganic particle in which the length of the surface (A) on the outer periphery of the particle is 80% or more of the length of the outer periphery of the particle in a cross-sectional SEM photograph of the separator.

The separator may comprise inorganic particles which does not have the surface (A) (that is, inorganic particles the surfaces of which consist only of the surface (B) and which are completely embedded in the resin) and inorganic particles in which the length of the surface (A) on an outer periphery of the particle is less than 50% of the length of the outer periphery of the particle in a cross-sectional SEM photograph of the separator. In the first embodiment, the total number of the inorganic particles (1), inorganic particles (2) and inorganic particles (3) is preferably 50% or more, more preferably 70% or more and most preferably 90% or more, and may be 100% of the total number of inorganic particles contained in the separator. In the second embodiment, the total number of the inorganic particles (2) and inorganic particles (3) is preferably 50% or more, more preferably 70% or more and most preferably 90% or more, and may be 100% of the total number of inorganic particles contained in the separator. In the third embodiment, the total number of the inorganic particles (3) is preferably 50% or more, more preferably 70% or more and most preferably 90% or more, and may be 100% of the total number of inorganic particles contained in the separator. 50 inorganic particles selected randomly from cross-sectional SEM photographs of the separator may be considered as all of the inorganic particles to simplify the calculation of the inorganic particle ratios.

In cross-sectional SEM observation of the separator, the inorganic particles may be fixed so as not to fall off by impregnating the separator with an appropriate resin before preparing a cross section for the observation with a microtome or the like. In addition, a freezing microtome method and the like may be used appropriately.

The total amount of inorganic particles contained in the separator is preferably 2 vol % or more, more preferably 5 vol % or more and most preferably 10 vol % or more of the outer dimension of the separator to enhance the short circuit prevention function of the separator. In addition, the total amount of inorganic particles is preferably 40 vol % or less and more preferably 20 vol % or less of the outer dimension of the separator to secure the volume of the voids required to hold an electrolyte solution. These values expressed in vol % can be converted to mass % using the specific gravity of the inorganic particle material.

The particle size of the inorganic particles is not particularly limited. The particle size may be adjusted such that separator characteristics, such as Gurley value and porosity, become appropriate values. In the first embodiment, the upper limit of the mode diameter of the inorganic particles (1), the inorganic particles (2) and the inorganic particles (3) is preferably 2 µm or less and more preferably 1 µm or less, and the lower limit thereof is preferably 0.1 µm or more and more preferably 0.2 µm or more. In the second embodiment, the upper limit of the mode diameter of the inorganic particles (2) and the inorganic particles (3) is preferably 2 µm or less and more preferably 1 µm or less, and the lower limit thereof is preferably 0.1 µm or more and more preferably 0.2 µm or more. In the third embodiment, the upper limit of the mode diameter of the inorganic particles (3) is preferably 2 µm or less and more preferably 1 µm or less, and the lower limit thereof is preferably 0.1 µm or more and more preferably 0.2 µm or more. Herein, the mode diameter means the mode value of a particle size distribution. 50 inorganic particles selected randomly from cross-sectional SEM photographs of the separator may be considered as all of the inorganic particles to simplify the calculation of the mode diameter of the inorganic particles. Herein, the particle size means the distance of the longest line connecting two points on the outer circumference of a particle in SEM observation.

The voids of the separator are formed, surrounded mainly by the surfaces of the resin and the inorganic particles or surrounded only by the resin. The separator may have a void not having the inorganic particle. It is also preferable that the larger the volume of the voids, the higher the probability that the voids have the inorganic particles. For example, it is also preferable that the presence probability of the inorganic particle is 0% or close to 0% in the void having a volume equal to or less than a certain value, and the presence probability of the inorganic particle increases and approaches 100% in void having a volume more than a certain value.

When the voids of the separator have a shape long in an in-plane direction of the separator or a shape spreading in the plane, compared to in the thickness direction of the separator, the mechanical strength against a force applied in the thickness direction of the separator is small. For this reason, the voids preferably have a shape in which the length in the thickness direction is equal to or longer than the length in an in-plane direction. Examples of such voids include those having a shape in which (the length in the thickness direction)/(the length in an in-plane direction) is within a high range, for example, 0.3 or more and 0.5 or more. Herein, the length means the maximum length in each direction. Note that it is not a problem for the voids open on a surface of the separator to have a shape spreading in an in-plane direction.

At least some of the voids are open on a surface of the separator. In addition, at least some of the voids communicate with at least one adjacent void. A hole connecting voids is referred to as a linking hole. The voids communicated with each other via the linking holes form a path from a void open on a surface of the separator to a void open on the other surface. Thus, the separator has gas-permeability. The Gurley value of the separator is not particularly limited. Gurley value is an index expressing air-permeability and means the number of seconds required to pass a specific volume of air at a specific pressure through a test piece. It can be measured in accordance with JIS P 8117. The Gurley value is preferably low to improve charge and discharge rate characteristics of a battery. In one embodiment of the present invention, the Gurley value of the separator is preferably 400 seconds or less, more preferably 300 seconds or less and most preferably 200 seconds or less. A separator with low Gurley value (high air permeability) is preferable in the viewpoint of charge and discharge rate characteristics of the battery.

However, when a metal precipitate is formed on a surface of an electrode, there is concern that the metal precipitate easily grows and penetrates through the separator. For this reason, in one aspect of the present invention, the Gurley value of the separator is preferably 1 second or more.

The porosity (%) of the separator is the volume ratio of the voids in the separator, and is calculated by the following formula (I).

$$\text{Porosity (\%)} = \{1-(V_1+V_2)/V\} \times 100 \tag{I}$$

$V_1$ represents the true volume of the resin in the separator. $V_2$ represents the volume of the inorganic particles in the separator. V represents the volume of the separator determined by the outer dimensions of the separator.

The weight of the inorganic particles contained in the separator is determined from the weight change when the inorganic particles have completely eluted from the separator, and the volume $V_2$ of the inorganic particles in the separator can be calculated from this weight using the specific gravity of the inorganic particles. Since the volume $V_1$ of the resin can be calculated using the specific gravity of the resin from the weight of the separator from which the inorganic particles have completely eluted, the porosity of the separator containing the inorganic particles can be calculated by formula (I).

The porosity of the separator is not particularly limited. In general, when the porosity is high, the air-permeability is also high. A high porosity separator can hold a lot of electrolyte solution inside. On the other hand, when the porosity is too high, the strength of a separator is low. In one aspect of the present invention, the porosity is preferably 30% or more and more preferably 40% or more. The porosity is preferably 85% or less and more preferably 75 or less.

The thickness of the separator is not particularly limited. In one aspect of the present invention, the thickness of the separator is preferably 5 μm or more and more preferably 10 μm or more to obtain mechanical strength. In one aspect of the present invention, the thickness of the separator is preferably 50 μm or less and more preferably 25 μm or less to increase the energy density of the secondary battery and to reduce the internal resistance.

Manufacturing Method for Separator

In the first manufacturing method, the separator used in the battery of the present invention can be produced by removing a part of the inorganic particle from a composite membrane comprising the base material resin and the inorganic particles to form the voids. The composite membrane can be prepared in accordance with a publicly known method. For example, WO2015/020101 and Japanese patent No. 5745195 disclose manufacturing methods of polyimide-inorganic particle composite membranes. The disclosure of these documents is incorporated by reference.

The method for removing the inorganic particles can be appropriately selected according to materials of the resin and inorganic particles. A removal method capable of removing inorganic particles while holding the resin is used.

In the method of dissolving and removing a part of the inorganic particle, first, the separator is brought into contact with a removing solution, and the inorganic particles exposed on a surface of the separator are partially dissolved and removed from the outside of the particles. The removing solution infiltrates into the separator and partially dissolves and removes the inorganic particles, which are in contact with the inorganic particle on a surface of the separator and are located deeper inside the separator, from outside of the particles as well. Conditions, such as the concentration of the solution, processing temperature and processing time, may be adjusted. Thereby, the inorganic particles are not dissolved out completely, and a part of the inorganic particles is left in the separator. As the removing solution for silica particles and zirconia particles, for example, hydrofluoric acid (HF aqueous solution) can be used. Eluting an outside part of the particle in this manner makes surface irregularities smooth, and the resin is hard to be damaged even if a compressive force is applied to the separator in a battery manufacturing process. In addition, the resin is hard to be damaged even if a compressive force is externally applied after the battery is finished.

Some of the inorganic particles may be completely removed with the removing solution. When the inorganic particles have a wide particle size distribution in the composite membrane comprising the base material resin and the inorganic particles before the surface removal, the voids not having the inorganic particle can be formed by completely eluting particles with small volume. Particle size distribution of inorganic particles before the surface removal may have not only one peak but also a plurality of peaks. The removal amount of the inorganic particle surfaces may be the volume or more of the inorganic particles exhibiting a peak low in the particle size distribution to produce the voids not having the inorganic particle, which is effective for ensuring air permeability, and the voids having the inorganic particle, which ensure insulation even if the resin part of the separator is damaged.

The amount ratio of the inorganic particles before and after the surface removal may be appropriately set according to the porosity and the size of the inorganic particles and the like needed. For example, the upper limit of the amount of the residual inorganic particles may be 70 vol % or less and may be 50 vol % or less with respect to the input of the inorganic particles. For example, the lower limit of the amount of the residual inorganic particles may be 5 vol % or more and may be 30 vol % or more with respect to the input of the inorganic particles.

In the second manufacturing method, the separator used in the battery of the present invention can be produced by removing coating layers from a composite membrane comprising the base material resin and the inorganic particles having the coating layer. A material removable under conditions capable of keeping the resin and the inorganic particles intact is used in the coating layer. Therefore, it is preferable that the material of the coating layer have a property, such as solubility, melting temperature, boiling temperature or decomposition temperature, largely different from that of the resin and the inorganic particles. In addition, the material insoluble in solvents used for forming the separator is used in the coating layer of the inorganic particles.

In the method of dissolving and removing the coating layer, first, the separator is brought into contact with a removing solution, and the coating layers of the inorganic particles exposed on a surface of the separator are dissolved and removed. The removing solution infiltrates into the separator and dissolves and removes the coating layers of the inorganic particles, which are in contact with the inorganic particle on a surface of the separator and are located deeper inside the separator. At this time, the coating layer may be completely removed.

For example, a coating layer made of silica may be formed on the surface of the inorganic particle, such as alumina, with etching resistance to HF aqueous solution.

The silica coating layer can be selectively removed due to a difference in etch rate versus the HF aqueous solution. The silica coating layer can be formed by a publicly known method, such as hydrolyzing tetraethoxysilane (TEOS) in a dispersion of the inorganic particles or attaching the silica particles to the surface of the inorganic particles.

The amount of the coating layer on the inorganic particle is appropriately set according to the porosity and the size of the inorganic particles and the like needed. For example, the upper limit of the total amount of the coating layers may be 95 vol % or less and may be 70 vol % or less with respect to the total amount of the inorganic particles which include the coating layers. For example, the lower limit of the total amount of the coating layers may be 30 vol % or more and may be 50 vol % or more with respect to the total amount of the inorganic particles which include the coating layers.

There is also known a method of forming voids by stretching a resin membrane containing inorganic particles near the softening point of the resin. However, the method of forming voids by removing the inorganic particles or the coating layer may be advantageous as compared to such a method. Since voids formed by stretching are less likely to communicate with other voids in the thickness direction of the separator, it is difficult to increase the air permeability. In forming the linking holes, it is necessary to increase the stretching amount of the resin membrane to thin the resin present between the voids becomes in the thickness direction of the separator. However, when the stretching amount is large, the voids have a shape spread in an in-plane direction, and the strength of the separator against an external force in the thickness direction is decreased.

In addition, a stretched membrane separator shrinks to return to its original shape when temperature rises to the stretched temperature. For this reason, it is difficult to maintain its shape at high temperature, and this is not suitable for high heat resistant separator. An unstretched separator is preferable in some cases in the present embodiment.

Lithium Ion Secondary Battery

In the battery of the present invention, the other components than the separator are not particularly limited. Hereinafter, the other components of a lithium ion secondary battery, such as positive electrode, negative electrode and electrolyte solution, will be described below, but the present invention is not limited thereto.

Positive Electrode

The positive electrode active material is not particularly limited as long as it is a material capable of absorbing and desorbing lithium, and may be selected from some viewpoints. From the viewpoint of high energy density, it is preferable to contain a compound having high capacity. Examples of the high capacity compound include lithium nickel composite oxides in which a part of the Ni of lithium nickelate ($LiNiO_2$) is replaced by another metal element, and layered lithium nickel composite oxides represented by the following formula (A) are preferred.

$Li_yNi_{(1-x)}M_xO_2$     (A)

wherein $0 \leq x < 1$, $0 < y \leq 1.2$, and M is at least one element selected from the group consisting of Co, Al, Mn, Fe, Ti, and B.

It is preferred that the content of Ni is high, that is, x is less than 0.5, further preferably 0.4 or less in the formula (A). Examples of such compounds include $Li_\alpha Ni_\beta Co_\gamma Mn_\delta O_2$ ($0<\alpha \leq 1.2$, preferably $1 \leq \alpha \leq 1.2$, $\beta+\gamma+\delta=1$, $\beta \geq 0.7$, and $\gamma \leq 0.2$) and $Li_\alpha Ni_\beta Co_\gamma Al_\delta O_2$ ($0<\alpha \leq 1.2$, preferably $1 \leq \alpha \leq 1.2$, $\beta+\gamma+\delta=1$, $\beta \geq 0.6$, preferably $\beta \geq 0.7$, and $\gamma \leq 0.2$) and particularly include $LiNi_\beta Co_\gamma Mn_\delta O_2$ ($0.75 \leq \beta \leq 0.85$, $0.05 \leq \gamma \leq 0.15$, and $0.10 \leq \delta \leq 0.20$). More specifically, for example, $LiNi_{0.8}Co_{0.05}Mn_{0.15}O_2$, $LiNi_{0.8}Co_{0.1}Mn_{0.1}O_2$, $LiNi_{0.8}Co_{0.15}Al_{0.05}O_2$, and $LiNi_{0.8}Co_{0.1}Al_{0.1}O_2$ may be preferably used.

From the viewpoint of thermal stability, it is also preferred that the content of Ni does not exceed 0.5, that is, x is 0.5 or more in the formula (A). In addition, it is also preferred that particular transition metals do not exceed half. Examples of such compounds include $Li_\alpha Ni_\beta Co_\gamma Mn_\delta O_2$ ($0<\alpha \leq 1.2$, preferably $1 \leq \alpha \leq 1.2$, $\beta+\gamma+\delta=1$, $0.2 \leq \beta \leq 0.5$, $0.1 \leq \gamma \leq 0.4$, and $0.1 \leq \delta \leq 0.4$). More specific examples may include $LiNi_{0.4}Co_{0.3}Mn_{0.3}O_2$ (abbreviated as NCM433), $LiNi_{1/3}Co_{1/3}Mn_{1/3}O_2$, $LiNi_{0.5}Co_{0.2}Mn_{0.3}O_2$ (abbreviated as NCM523), and $LiNi_{0.5}Co_{0.3}Mn_{0.2}O_2$ (abbreviated as NCM532) (also including those in which the content of each transition metal fluctuates by about 10% in these compounds).

In addition, two or more compounds represented by the formula (A) may be mixed and used, and, for example, it is also preferred that NCM532 or NCM523 and NCM433 are mixed in the range of 9:1 to 1:9 (as a typical example, 2:1) and used. Further, by mixing a material in which the content of Ni is high (x is 0.4 or less in the formula (A)) and a material in which the content of Ni does not exceed 0.5 (x is 0.5 or more, for example, NCM433), a battery having high capacity and high thermal stability can also be formed.

Examples of the positive electrode active materials other than the above include lithium manganate having a layered structure or a spinel structure such as $LiMnO_2$, $Li_xMn_2O_4$ ($0<x<2$), $Li_2MnO_3$, and $Li_xMn_{1.5}Ni_{0.5}O_4$ ($0<x<2$); $LiCoO_2$ or materials in which a part of the transition metal in this material is replaced by other metal(s); materials in which Li is excessive as compared with the stoichiometric composition in these lithium transition metal oxides; materials having an olivine structure such as $LiFePO_4$, and the like. In addition, materials in which a part of elements in these metal oxides is substituted by Al, Fe, P, Ti, Si, Pb, Sn, In, Bi, Ag, Ba, Ca, Hg, Pd, Pt, Te, Zn, La or the like are also usable. The positive electrode active materials described above may be used alone or in combination of two or more.

The positive electrode may be prepared by forming a positive electrode active material layer comprising the positive electrode active material, the conductive assisting agent and the positive electrode binder. Examples of a method of forming the positive electrode active material layer include a doctor blade method, a die coater method, a CVD method, a sputtering method, and the like. It is also possible that after forming the positive electrode active material layer in advance, a thin film of aluminum, nickel or an alloy thereof may be formed by a method such as vapor deposition, sputtering or the like to obtain a positive electrode current collector.

Negative Electrode

The negative electrode active material is not particularly limited as long as it is a material capable of reversibly intercalating and deintercalating lithium ions upon charge/discharge. Specifically, metals, metal oxides and carbon are exemplified.

Examples of the metal include Li, Al, Si, Pb, Sn, In, Bi, Ag, Ba, Ca, Hg, Pd, Pt, Te, Zn, La, alloys of two or more of these and the like. Alternatively, it may be used by mixing two or more of these metals and alloys. These metals and alloys may comprise one or more non-metal elements.

Examples of the metal oxide include silicon oxide, aluminum oxide, tin oxide, indium oxide, zinc oxide, lithium oxide, and composites of these. In the present embodiment, tin oxide or silicon oxide is preferably contained as a negative electrode active material of the metal oxide, and silicon oxide is more preferably contained. This is because silicon oxide is relatively stable and is unlikely to trigger a reaction with other compounds. Also, for example, 0.1 to 5 mass % of one or two or more elements selected from nitrogen, boron, and sulfur can be added to the metal oxide. In this way, the electroconductivity of the metal oxide can be enhanced.

Examples of the carbon include graphite, amorphous carbon, graphene, diamond-like carbon, carbon nanotube, and composites thereof. Here, highly crystalline carbon is highly electroconductive, and has excellent adhesion to a negative electrode current collector composed of a metal such as copper as well as voltage flatness. On the other hand, low-crystallinity amorphous carbon shows relatively small volume expansion, is thus highly effective in lessening the volume expansion of the entire negative electrode, and is unlikely to undergo degradation resulting from non-uniformity such as grain boundaries and defects.

The negative electrode may be prepared by forming a negative electrode active material layer comprising the negative electrode active material, the conductive assisting agent and the negative electrode binder. Examples of a method of forming the negative electrode active material layer include a doctor blade method, a die coater method, a CVD method, a sputtering method, and the like. It is also possible that after forming the negative electrode active material layer in advance, a thin film of aluminum, nickel or an alloy thereof may be formed by a method such as vapor deposition, sputtering or the like to obtain a negative electrode current collector.

Electrolyte Solution

The electrolyte solution of the secondary battery according to the present embodiment is not particularly limited, but is preferably a non-aqueous electrolyte solution containing a non-aqueous solvent and a supporting salt which are stable at an operating potential of the battery.

Examples of the non-aqueous solvent include aprotic organic solvents, for examples, cyclic carbonates such as propylene carbonate (PC), ethylene carbonate (EC) and butylene carbonate (BC); open-chain carbonates such as dimethyl carbonate (DMC), diethyl carbonate (DEC), ethyl methyl carbonate (EMC) and dipropyl carbonate (DPC); aliphatic carboxylic acid esters such as propylene carbonate derivatives, methyl formate, methyl acetate and ethyl propionate; ethers such as diethyl ether and ethyl propyl ether; phosphoric acid esters such as trimethyl phosphate, triethyl phosphate, tripropyl phosphate, trioctyl phosphate and triphenyl phosphate; and fluorinated aprotic organic solvents obtainable by substituting at least a part of hydrogen atoms of these compounds with fluorine atom(s), and the like.

Among them, cyclic or open-chain carbonate(s) such as ethylene carbonate (EC), propylene carbonate (PC), butylene carbonate (BC), dimethyl carbonate (DMC), diethyl carbonate (DEC), ethyl methyl carbonate (EMC), dipropyl carbonate (DPC) or the like is preferably contained.

The non-aqueous solvents may be used alone, or in combination of two or more.

Examples of the supporting salt include $LiPF_6$, $LiAsF_6$, $LiAlCl_4$, $LiClO_4$, $LiBF_4$, $LiSbF_6$, $LiCF_3SO_3$, $LiC_4F_9SO_3$, $LiC(CF_3SO_2)_3$, $LiN(CF_3SO_2)_2$ and the like. The supporting salts may be used alone or in combination of two or more. From the viewpoint of cost reduction, $LiPF_6$ is preferable.

The electrolyte solution may further contain additives. The additive is not particularly limited, and examples thereof include halogenated cyclic carbonates, carboxylic anhydrides, unsaturated cyclic carbonates, cyclic or open-chain disulfonic acid esters, and the like. These compounds can improve battery characteristics such as cycle characteristics. This is presumably because these additives decompose during charge/discharge of the secondary battery to form a film on the surface of an electrode active material to inhibit decomposition of an electrolyte solution and a supporting salt.

Structure of Secondary Battery

Figure 2:
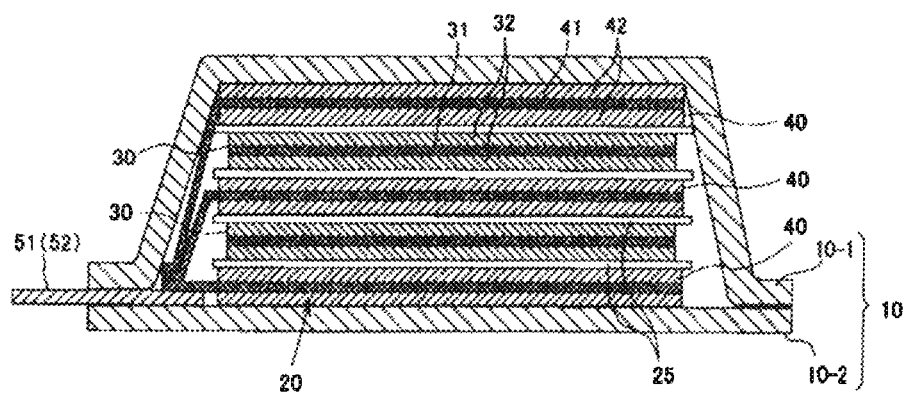
FIG. 2 is a cross-sectional view schematically showing a cross section of the battery of FIG. 1.

The secondary battery according to the present embodiment may be, for example, a secondary battery having a structure as shown in FIGS. 1 and 2. This secondary battery comprises a battery element 20, a film package 10 housing the battery element 20 together with an electrolyte, and a positive electrode tab 51 and a negative electrode tab 52 (hereinafter these are also simply referred to as "electrode tabs").

In the battery element 20, a plurality of positive electrodes 30 and a plurality of negative electrodes 40 are alternately stacked with separators 25 sandwiched therebetween as shown in FIG. 2. In the positive electrode 30, an electrode material 32 is applied to both surfaces of a metal foil 31, and also in the negative electrode 40, an electrode material 42 is applied to both surfaces of a metal foil 41 in the same manner. The present invention is not necessarily limited to stacking type batteries and may also be applied to batteries such as a winding type.

As shown in FIGS. 1 and 2, the secondary battery according to the present embodiment may have an arrangement in which the electrode tabs are drawn out to one side of the outer package, but the electrode tab may be drawn out to both sides of the outer package. Although detailed illustration is omitted, the metal foils of the positive electrodes and the negative electrodes each have an extended portion in part of the outer periphery. The extended portions of the negative electrode metal foils are brought together into one and connected to the negative electrode tab 52, and the extended portions of the positive electrode metal foils are brought together into one and connected to the positive electrode tab 51 (see FIG. 2). The portion in which the extended portions are brought together into one in the stacking direction in this manner is also referred to as a "current collecting portion" or the like.

The film package 10 is composed of two films 10-1 and 10-2 in this example. The films 10-1 and 10-2 are heat-sealed to each other in the peripheral portion of the battery element 20 and hermetically sealed. In FIG. 1, the positive electrode tab 51 and the negative electrode tab 52 are drawn out in the same direction from one short side of the film package 10 hermetically sealed in this manner.

Of course, the electrode tabs may be drawn out from different two sides respectively. In addition, regarding the arrangement of the films, in FIG. 1 and FIG. 2, an example in which a cup portion is formed in one film 10-1 and a cup portion is not formed in the other film 10-2 is shown, but other than this, an arrangement in which cup portions are formed in both films (not illustrated), an arrangement in which a cup portion is not formed in either film (not illustrated), and the like may also be adopted.

Method for Manufacturing Secondary Battery

The secondary battery according to the present embodiment can be manufactured by a conventional method. An example of a method for manufacturing a secondary battery will be described taking a stacked laminate type secondary battery as an example. First, in the dry air or an inert atmosphere, the positive electrode and the negative electrode are placed to oppose to each other via a separator to form an electrode element. Next, this electrode element is accommodated in an outer package (container), an electrolyte solution is injected, and the electrodes are impregnated with the electrolyte solution. Thereafter, the opening of the outer package is sealed to complete the secondary battery.

Assembled Battery

A plurality of the secondary batteries according to the present embodiment may be combined to form an assembled battery. The assembled battery may be configured by connecting two or more secondary batteries according to the present embodiment in series or in parallel or in combination of both. The connection in series and/or parallel makes it possible to adjust the capacitance and voltage freely. The number of the secondary batteries included in the assembled battery can be set appropriately according to the battery capacity and output.

Vehicle

The secondary battery or the assembled battery according to the present embodiment can be used in vehicles. Vehicles according to the present embodiment include hybrid vehicles, fuel cell vehicles, electric vehicles (besides four-wheel vehicles (cars, trucks, commercial vehicles such as buses, light automobiles, etc.) two-wheeled vehicle (bike) and tricycle), and the like. The vehicles according to the present embodiment is not limited to automobiles, it may be a variety of power source of other vehicles, such as a moving body like a train.

EXAMPLE

In this example section, polyimide resin separators, comprising silica particles in voids, were prepared by the first manufacturing method explained in <Manufacturing method of separator> and were used. Specifically, these were prepared in accordance with a method disclosed in WO2015/020101 and Japanese Patent No. 5745195 except that the silica particles were left in the separator.

In this example section, to prepare the separator used in the battery, pyromellitic dianhydride that is a tetracarboxylic acid dianhydride and 4,4'-diaminodiphenyl ether that is a diamine were used as polyimide raw materials, and N,N-dimethylacetamide as an organic solvent and a polyoxyethylene secondary alkyl ether type dispersant as a dispersant were used. As fine particles, silica particles having a mode diameter of 0.7 µm were used.

Preparation of Varnish

Pyromellitic dianhydride, 4,4'-diaminodiphenyl ether and N,N-dimethylacetamide were mixed and stirred to prepare a polyamic acid solution in accordance with Japanese Patent No. 5745195. The silica fine particles and the dispersant were added to the resulting polyamic acid solution to prepare a varnish which contains the polyamic acid and the silica fine particles at a volume ratio of 28:72.

Formation of Polyimide-Fine Particle Composite Membrane

The above varnish was formed into a membrane on a glass plate coated with a release agent by an applicator. An uncalcined composite membrane having a thickness of about 23 µm was produced by pre-baking at 70° C. for 5 minutes.

The uncalcined composite membrane was peeled off from the substrate, the release agent was then removed with ethanol, and a heat treatment was performed at 320° C. for 15 minutes to complete imidization.

Formation of Polyimide Porous Membrane

The polyimide-silica particle composite membrane was immersed in an HF aqueous solution to etch the silica particles contained in the membrane. The silica particles were left in the polyimide-silica particle composite membrane by adjusting the concentration of the HF aqueous solution for immersing the polyimide-silica particle composite membrane and the immersion time. After etching with the HF solution, the polyimide-silica particle composite membrane was washed with water and was dried to prepare polyimide porous membrane containing silica particles.

Formation of Polyimide Porous Separator

The polyimide porous membrane was subject to the chemical etching described in WO2015/020101 to prepare a polyimide porous separator. In the chemical etching, an etchant prepared by diluting sodium hydroxide with a 50 wt % aqueous solution of methanol to 1.04% was used. Thereby, the aperture ratio of the polyimide porous membrane and the air permeability between voids can be increased.

Example 1

As a separator used in the battery of Example 1, a separator comprising silica particles in an amount of 5 vol % with respect to the volume of the separator determined by the outer dimensions of the separator and having a porosity of 75%, a thickness of 20 µm, and a Gurley value of 200 seconds was produced. The mode diameter of 50 silica particles which were randomly selected from cross-sectional SEM photographs of the separator was about 0.4 µm. Among the 50 particles, the number of particles in which the length of the surface (A) on the outer periphery of the particle was 80% or more of the length of the outer periphery of the particle was 45 or more. Hereinafter, the separator of Example 1 is referred to as "separator 1" in some cases.

Detachment Resistance Test of Inorganic Particles

Whether the lumps of the inorganic particles were not dropped from the separator 1 was checked as follows. First, the separator was cut into 50 mm×50 mm and was fixed to a stainless steel plate with double-sided tape. Second, a cellophane tape (CT18, manufactured by Nichiban. Co., Ltd.) was affixed to a surface of the separator, and then the cellophane tape was peeled off. On the adhesive surface of the cellophane tape, no migration of inorganic particles was seen by visual observation and optical microscope observation of 300 times. These results show that the separator used in the battery of Example 1 can hold the inorganic particles strongly, and the inorganic particles hardly fall Off by an external force during producing the battery or after finishing the battery.

In addition, the separator 1 was cut with a rotary cutter, and the cut end face was observed by an optical microscope at 300 times magnification. As a result, the inorganic particles are not seen on the cut end face of the separator 1.

Insulation Test During Compression

To evaluate the capability to maintain insulation, the separator 1 was pressed with a stainless steel (SUS) nail with rounded tip. A sheet of glass cloth with a thickness of 0.3 mm and an aluminum foil with a thickness of 25 µm were stacked in this order on an aluminum plate, and the separator was placed thereon. When 1 minute passes while the SUS nail with rounded tip, which had a tip angle of 30° and a tip radius of 0.9 mm, was pressed against a surface of the separator at a vertical load of 10N, the DC resistance between the aluminum foil and the SUS nail was measured. The test was conducted at ambient temperature, 25° C., and the temperature of the SUS nail was 25° C. or 400° C.

When the temperature of the SUS nail was 25° C., the DC resistance between the aluminum foil and the SUS nail exceeded the measurement upper limit of 20 MΩ. When the temperature of the SUS nail was 400° C., the DC resistance between the aluminum foil and the SUS nail was 10 kΩ. Although the separator resin was compressed in a heat-softened state, the inorganic particles presumably prevented a short-circuit.

The battery of Example 1 was produced as follows.

Positive Electrode

Lithium nickelate, a carbon conductive assisting agent and a polyvinylidene fluoride binder were dispersed in N-methyl-2-pyrrolidone at a weight ratio of 92:4:4. The resulting slurry was applied to an aluminum collector foil and was dried to prepare a positive electrode active material layer. In the same manner, a positive electrode active material layer was also prepared on the other side of the aluminum collector foil, and after pressing, a positive electrode plate was obtained.

Negative Electrode

Natural graphite, sodium carboxymethyl cellulose as a thickener and styrene butadiene rubber as a binder were mixed in an aqueous solution at a weight ratio of 98:1:1. The resulting slurry was applied to a copper collector foil and was dried to prepare a negative electrode active material layer. In the same manner, a negative electrode active material layer was also prepared on the other side of the copper collector foil, and after pressing, a negative electrode plate was obtained.

Formation of Electrode Laminate

The positive electrode palates were cut into a size of 40 mm×40 mm excluding an electric current extracting part, and the negative electrode plates were cut into a size of 42 mm×42 mm excluding an electric current extracting part. The separators were cut into a size of 44 mm×44 mm. Two positive electrodes and three negative electrodes were stacked via the separators in the order of the negative electrode, the separator, the positive electrode, and the separator, and thus, an electrode laminate was obtained.

Tabs of the positive electrodes and the negative electrodes were respectively connected to the electric current extracting parts of the positive electrodes and the negative electrodes in the electrode laminate by ultrasonic welding, and the electrode laminate was housed in a film outer package formed of a laminate film composed of an aluminum film and a resin film. After injecting an electrolyte solution into the outer package, the outer package was sealed under a reduced pressure atmosphere of 1.5 kPa. In the electrolyte solution, a non-aqueous solvent prepared by mixing EC and DEC at a volume ratio of 30:70 was used, and into this, $LiPF_6$ as a supporting salt was dissolved at a concentration of 1M. The battery was kept at 25° C. for 12 hours after sealing the outer package. Subsequently, initial charge and discharge were performed to finish the battery. This battery was discharged at a constant current of 20 mA from 4.2 V to 2.5 V, and at this time, the capacity of the battery was about 100 mAh.

Insulation Test of Battery

The battery of Example 1 was put on a SUS plate covered with a polyethylene sheet, and a SUS nail having a tip angle of 60° and a shaft diameter of 3 mm was pressed against the surface of the outer package in a direction perpendicular to the electrode surfaces at a load of 15 N. The voltage between a positive electrode tab and a negative electrode tab was 3.9 V in a state where the SUS nail had been pressed down for ten minutes.

After the test, the outer package was opened, and the electrode laminate was checked to confirm the shirt circuit condition. As a result, the tip of the SUS nail penetrated the first negative electrode and the first separator, which were placed on the front side, and reached the first positive electrode, but did not penetrate the first positive electrode. The separator on the back side of the first positive electrode did not have a crack and a hole. Thus, the short circuit occurred between the first positive electrode and the first negative electrode, which were placed on the front side.

When the periphery of the hole of the first separator drilled by the nail was observed, the hole had the same shape as that of the first positive electrode, but was not larger than that of the first positive electrode.

Example 2

As a separator used in the battery of Example 2, a separator comprising silica particles in an amount of 30 vol % with respect to the volume of the separator determined by the outer dimensions of the separator and having a porosity of 50%, a thickness of 20 µm, and a Gurley value of 300 seconds was produced. The mode diameter of 50 silica particles which is randomly selected from cross-sectional SEM photographs of the separator was about 0.4 µm. Among the 50 particles, the number of particles in which the length of the surface (A) on the outer periphery of the particle is 80% or more of the length of the outer periphery of the particle was 45 or more. Hereinafter, the separator of Example 2 is referred to as "separator 2" in some cases.

Detachment Resistance Test of Inorganic Particles

Whether the lumps of the inorganic particles were not dropped from the separator 2 was checked, using a cellophane tape in the same manner as in Example 1. On the adhesive surface of the cellophane tape, no migration of inorganic particles was seen by visual observation and optical microscope observation of 300 times. These results show that the separator used in the battery of Example 2 can hold the inorganic particles strongly, and the inorganic particles hardly fall off by an external force during producing the battery or after finishing the battery.

In addition, the separator 2 was cut with a rotary cutter, and the cut end face was observed by an optical microscope at 300 times magnification. As a result, the inorganic particles were not seen on the cut end face of the separator 2.

Insulation Test During Compression

To evaluate the capability to maintain insulation, a stainless steel (SUS) nail with rounded tip was pressed against the separator 2 in the same manner as in Example 1. When the temperature of the SUS nail was 25° C., the DC resistance between the aluminum foil and the SUS nail exceeded the measurement upper limit of 20 MΩ. When the temperature of the SUS nail was 400° C., the DC resistance between the aluminum foil and the SUS nail was 100 kΩ. Although the separator resin was compressed in a heat-softened state, the inorganic particles presumably prevented a short-circuit.

Fabrication of Battery

The battery of Example 2 was produced in the same manner as in Example 1 except that the separator 2 was used as a separator. This battery was discharged at a constant current of 20 mA from 4.2 V to 2.5 V, and at this time, the capacity of the battery was about 100 mAh.

Insulation Test of Battery

The insulation test using a nail Was conducted in the same manner as in Example 1. The voltage between a positive electrode tab and a negative electrode tab was 3.9 V in a state where the SUS nail had been pressed down for ten minutes.

After the test, the outer package was opened, and the electrode laminate was checked to confirm the shirt circuit condition. As a result, the tip of the SUS nail penetrated the first negative electrode and the first separator, which were placed on the front side, and reached the first positive electrode, but did not penetrate the first positive electrode. The separator on the back side of the first positive electrode did not have a crack and a hole. Thus, the short circuit occurred between the first positive electrode and the first negative electrode, which were placed on the front side.

When the periphery of the hole of the first separator drilled by the nail was observed, the hole had the same shape as that of the first positive electrode, but was not larger than that of the first positive electrode.

Comparative Example 1

A separator used in the battery of Comparative example 1 was produced by immersing the separator 1 in a HF aqueous solution to completely remove the silica particles. The resulting separator had a thickness of 20 μm, a Gurley value of 100 seconds and a porosity of 80%. Hereinafter, this separator is referred to as "separator 3" in some cases. Since the separator 3 does not contain inorganic particles, inorganic particles do not fall off.

Insulation Test During Compression

To evaluate the capability to maintain insulation, a stainless steel (SUS) nail with rounded tip was pressed against the separator 3 in the same manner as in Example 1. When the temperature of the SUS nail was 25° C., the DC resistance between the aluminum foil and the SUS nail exceeded the measurement upper limit of 20 MΩ. When the temperature of the SUS nail was 400° C., the DC resistance between the aluminum foil and the SUS nail was 0.5 kΩ. Since the separator resin was compressed in a heat-softened state, insulation was decreased.

Fabrication of Battery

The battery of Comparative example 1 was produced in the same manner as in Example 1 except that the separator 3 was used as a separator. This battery was discharged at a constant current of 20 mA from 4.2 V to 2.5 V, and at this time, the capacity of the battery was about 100 mAh.

Insulation Test of Battery

The insulation test using a nail was conducted in the same manner as in Example 1. The voltage between a positive electrode tab and a negative electrode tab was 3.7 V in a state where the SUS nail had been pressed down for ten minutes. Compared to those of Example 1 and Example 2, the voltage drop was large. That is, a larger short-circuit current flows in the battery of Comparative Example 1 than in those of Example 1 and Example 2.

After the test, the outer package was opened, and the electrode laminate was checked to confirm the shirt circuit condition. As a result, the tip of the SUS nail penetrated the first negative electrode and the first separator, which were placed on the front side, and reached the first positive electrode, but did not penetrate the first positive electrode. The separator on the back side of the first positive electrode did not have a crack and a hole. Thus, the short circuit occurred between the first positive electrode and the first negative electrode, which were placed on the front side.

When the periphery of the hole of the first separator drilled by the nail was observed, the hole had the same shape as that of the first positive electrode, but was not larger than that of the first positive electrode.

Comparative Example 2

As a separator used in the battery of Comparative example 2, a separator was produced by coating a silica particle layer on one side surface of the separator 3. As the silica particles, those having a mode diameter of about 0.7 μm were used. The silica particles were dispersed together with polyvinylidene fluoride in N-methyl-2-pyrrolidone to prepare a slurry. The slurry was applied by a doctor blade method. The thickness of the silica particle layer was adjusted after drying treatment of N-methyl-2-pyrrolidone such that the thickness of the separator in total with the substrate was 25 μm. Hereinafter, this separator is referred to as "separator 4" in some cases.

Detachment Resistance Test of Inorganic Particles

The capability to hold the inorganic particles in the separator 4 was examined using a cellophane tape in the same manner as in Example 1. As a result of observing the adhesive surface of the cellophane tape, it was seen by visual observation and optical microscope observation of 300 times that the silica particle layer peeled off from an interfacial surface with the base material and moved to the adhesive surface of the cellophane tape. These results show lumps of the inorganic particles can fall off from the separator used in the battery of Comparative example 2 by an external force.

In addition, the separator 4 was cut with a rotary cutter, and the cut end face was observed by an optical microscope at 300 times magnification. As a result, a part of an edge of the silica particle layer on a surface of the separator was found chipped. It is presumed that a part of the silica particle layer was abraded or cracked and then was peeled off.

Insulation Test During Compression

To evaluate the capability to maintain insulation, a stainless steel (SUS) nail with rounded tip was pressed against the separator 4 in the same manner as in Example 1. When the temperature of the SUS nail was 25° C., the DC resistance between the aluminum foil and the SUS nail exceeded the measurement upper limit of 20 MΩ. When the temperature of the SUS nail was 400° C., the DC resistance between the aluminum foil and the SUS nail was 100 kΩ. Although the separator resin was compressed in a heat-softened state, the inorganic particles presumably prevented a short-circuit.

Fabrication of Battery

The battery of Comparative example 2 was produced in the same manner as in Example 1 except that the separator 4 was used as a separator. This battery was discharged at a constant current of 20 mA from 4.2 V to 2.5 V, and at this time, the capacity of the battery was about 100 mAh.

Insulation Test of Battery

The insulation test using a nail was conducted in the same manner as in Example 1. The voltage between a positive electrode tab and a negative electrode tab was 3.75 V in a state where the SUS nail had been pressed down for ten minutes.

After the test, the outer package was opened, and the electrode laminate was checked to confirm the shirt circuit condition. As a result, the tip of the SUS nail penetrated the first negative electrode and the first separator, which were placed on the front side, and reached the first positive electrode, but did not penetrate the first positive electrode. The separator on the back side of the first positive electrode did not have a crack and a hole. Thus, the short circuit occurred between the first positive electrode and the first negative electrode, which were placed on the front side.

When the periphery of the hole of the first separator drilled by the nail was observed, the hole had the same shape as that of the first positive electrode, but was not larger than that of the first positive electrode. However, fine fragments of the silica particle layer placed on a surface of the substrate were seen by optical microscope observation of 300 times, and it was also seen that the surface of the substrate was partially exposed.

From Example 1, Example 2 and Comparative example 1, it is understood that when a conductive foreign material sticks from the outside, the battery of the present invention can keep a short-circuit resistance higher than a battery using a separator without the inorganic particles, and therefore can suppress a short-circuit current and heat generation.

In addition, when a battery is manufactured or when an external force is applied in use as a battery, the inorganic particles are less likely to fall off from the separator in the case of the battery of the present invention than in the case of a battery using a conventional separator having an inorganic particle layer on a surface. Thus, the battery of the present invention is less likely to comprise a foreign material derived from the inorganic particles of the separator inside the battery. Therefore, the battery according to the present invention is less likely to comprise a foreign material derived from the inorganic particles in the battery. Even if a conductive foreign material sticks from the outside, a decrease in short-circuit resistance due to drop of the inorganic particles is less likely to occur than in a battery using a conventional separator having a inorganic particle layer on a surface of a substrate.

Reference Example 1

For Reference example 1, a simulated battery with the same laminate structure as in Example 1 was produced. In a battery containing an electrolyte solution, since electricity flows through the electrolyte solution, it is difficult to know the insulation state of the battery accurately from a resistance between a negative electrode tab and a positive electrode tab. For this reason, in Reference example 1, a simulated battery not containing an electrolyte solution was produced, and a resistance between a negative electrode tab and a positive electrode tab was measured.

Fabrication of Simulated Battery

Tabs of the positive electrodes and the negative electrodes were respectively connected to the electric current extracting parts of the positive electrodes and the negative electrodes in the electrode laminate by ultrasonic welding, and the electrode laminate was housed in a film outer package formed of a laminate film composed of an aluminum film and a resin film. Then the outer package, which housed the electrode laminate, was sealed under a reduced pressure atmosphere of 1.5 kPa to produce a simulated battery. The DC resistance between a positive electrode tab and a negative electrode tab exceeded the measurement upper limit of 20 MΩ.

Insulation Test During Compression

The simulated battery of Reference example 1, in which the outer package housing the electrode laminate was sealed, was put on a SUS plate covered with a polyethylene sheet, and a SUS nail having a tip angle of 60° and a shaft diameter of 3 mm was pressed against the surface of the outer package in a direction perpendicular to the electrode surfaces at a load of 15 N. The tip of the nail penetrated the outer package of the simulated battery and bit into the electrode laminate. The DC resistance between a positive electrode tab and a negative electrode tab was 90Ω in a state where the SUS nail had been pressed down for ten minutes. After the test, the outer package was opened to check the electrode laminate. As a result, the tip of the SUS nail penetrated the first negative electrode and the first separator, which were placed on the front side, and reached the first positive electrode, but did not penetrate the first positive electrode. The separator on the back side of the first positive electrode did not have a crack and a hole. Thus, the short circuit occurred between the first positive electrode and the first negative electrode, which were placed on the front side.

Reference Example 2

In Reference example 2, a simulated battery was produced by housing a prepared electrode laminate in an outer package and sealing it under a reduced pressure atmosphere in the same manner as in Reference example 1 except that the electrode laminate was the same as in Comparative example 1. The DC resistance between a positive electrode tab and a negative electrode tab exceeded the measurement upper limit of 20 MΩ. An insulation test was conducted in the same manner as in Reference example 1. The DC resistance between a positive electrode tab and a negative electrode tab was 20Ω in a state where the SUS nail had been pressed down for ten minutes. After the test, the outer package was opened to check the electrode laminate. As a result, the tip of the SUS nail penetrated the first negative electrode and the first separator, which were placed on the front side, and reached the first positive electrode, but did not penetrate the first positive electrode. The separator on the back side of the first positive electrode did not have a crack and a hole. Thus, the short circuit occurred between the first positive electrode and the first negative electrode, which were placed on the front side.

The voltage drops in Examples 1 and 2 were smaller than the voltage drops in Comparative examples 1 and 2 in the insulation tests using a nail. The results of Reference examples 1 and 2 show that this is presumably due to a difference in short circuit resistance between a positive electrode and a negative electrode between Examples 1 and 2 and Comparative examples 1 and 2.

This application claims priority right based on Japanese patent application No. 2016-84564, filed on Apr. 20, 2016, the entire disclosure of which is hereby incorporated by reference.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

INDUSTRIAL APPLICABILITY

The secondary battery according to the present invention can be utilized in, for example, all the industrial fields requiring a power supply and the industrial fields pertaining to the transportation, storage and supply of electric energy. Specifically, it can be used in, for example, power supplies for mobile equipment such as cellular phones and notebook personal computers; power supplies for electrically driven vehicles including an electric vehicle, a hybrid vehicle, an electric motorbike and an electric-assisted bike, and moving/transporting media such as trains, satellites and submarines; backup power supplies for UPSs; and electricity storage facilities for storing electric power generated by photovoltaic power generation, wind power generation and the like.

EXPLANATION OF REFERENCE 10 film package
20 battery element
25 separator
30 positive electrode
40 negative electrode

The invention claimed is:

1. A battery comprising a separator, the separator comprising
a porous resin membrane having voids and
inorganic particles,
wherein the inorganic particles contained in the separator account for 5 vol % or more of the separator,
wherein the separator is obtained by bringing an initial composite membrane comprising a resin and the inorganic particles into contact with a removing solution capable of dissolving the inorganic particles to remove 5 vol % to 70 vol % of the inorganic particles to form the voids,
wherein 50% or more of the inorganic particles contained in the separator have a surface (A) facing one of the voids and a surface (B) in contact with the resin, wherein the length of the surface (A) is 50% or more of the length of the outer periphery of the particle in a cross-sectional SEM photograph of the separator, and
wherein the voids which are not open on a surface of the separator have a shape in which (the length in the thickness direction)/(the length in an in-plane direction) is 0.3 or more.

2. The battery according to claim 1, wherein the inorganic particles are selected from the group consisting of aluminum oxide, silicon oxide, titanium oxide, zirconium oxide, magnesium oxide, zinc oxide, strontium titanate, barium titanate, aluminum nitride, and silicon nitride.

3. The battery according to claim 1, wherein the resin has a melting temperature and/or a decomposition temperature of 200° C. or more.

4. The battery according to claim 3, wherein the resin is at least one selected from the group consisting of polyethylene terephthalate, aramid, polyimide, polyamideimide, and polyphenylene sulfide.

5. A manufacturing method for a battery comprising the steps of:
fabricating an electrode element by stacking a negative electrode and a positive electrode via a separator, and
encapsulating the electrode element and an electrolyte solution into an outer package,
wherein the separator comprises a porous resin membrane having voids and inorganic particles,
wherein the inorganic particles contained in the separator account for 5 vol % or more of the separator,
wherein the separator is obtained by bringing an initial composite membrane comprising a resin and the inorganic particles into contact with a removing solution capable of dissolving the inorganic particles to remove 5 vol % to 70 vol % of the inorganic particles to form the voids,
wherein 50% or more of the inorganic particles contained in the separator have a surface (A) facing one of the voids and a surface (B) in contact with the resin, wherein the length of the surface (A) is 50% or more of the length of the outer periphery of the particle in a cross-sectional SEM photograph of the separator, and
wherein the voids which are not open on a surface of the separator have a shape in which (the length in the thickness direction)/(the length in an in-plane direction) is 0.3 or more.

6. The battery according to claim 1, wherein the inorganic particles are present inside the one of the voids.

* * * * *